(12) United States Patent
Naito

(10) Patent No.: US 9,273,900 B2
(45) Date of Patent: Mar. 1, 2016

(54) EXHAUST GAS TREATMENT SYSTEM FOR OXYFUEL COMBUSTION DEVICE

(71) Applicant: IHI Corporation, Tokyo (JP)

(72) Inventor: Toshiyuki Naito, Tokyo (JP)

(73) Assignee: IHI Corporation, Tokyo (JP)

( * ) Notice: Subject to any disclaimer, the term of this patent is extended or adjusted under 35 U.S.C. 154(b) by 242 days.

(21) Appl. No.: 13/960,538

(22) Filed: Aug. 6, 2013

(65) Prior Publication Data

US 2013/0319040 A1    Dec. 5, 2013

Related U.S. Application Data

(63) Continuation of application No. PCT/JP2011/000690, filed on Feb. 8, 2011.

(51) Int. Cl.
    *B01D 53/00*     (2006.01)
    *F25J 1/00*      (2006.01)
    (Continued)

(52) U.S. Cl.
    CPC ............. *F25J 1/0027* (2013.01); *B01D 53/002* (2013.01); *B01D 53/261* (2013.01); *B01D 53/64* (2013.01); *F23J 15/06* (2013.01); *F23L 7/007* (2013.01); *B01D 2256/22* (2013.01); *B01D 2257/2045* (2013.01); *B01D 2257/302* (2013.01); *B01D 2257/404* (2013.01); *B01D 2257/602* (2013.01); *B01D 2257/80* (2013.01);
    (Continued)

(58) Field of Classification Search
    CPC .... B01D 53/002; B01D 53/26; B01D 53/261; B01D 53/263; B01D 53/64; F23J 15/06; F23L 7/007; F25J 1/0027
    USPC .............................. 422/168, 169; 62/606, 617
    See application file for complete search history.

(56) References Cited

U.S. PATENT DOCUMENTS 7,416,716 B2    8/2008  Allam et al.
7,927,568 B2 *  4/2011  Fan et al. ...................... 423/220
                (Continued)

FOREIGN PATENT DOCUMENTS

JP    2007-145709 A      6/2007
JP    2010-172878 A      8/2010
WO    WO 2009/095581   *  8/2009

OTHER PUBLICATIONS

International Search Report mailed on Apr. 19, 2011 for PCT/JP2011/000690 filed Feb. 8, 2011 in English.
(Continued)

*Primary Examiner* — Jill Warden
*Assistant Examiner* — Joye L Woodard
(74) *Attorney, Agent, or Firm* — Oblon, McClelland, Maier & Neustadt, L.L.P.

(57) ABSTRACT

Provided are a front impurity-removing device with a compressor for compression of the exhaust gas from an oxyfuel combustion device to make impurities in the exhaust gas water-soluble and with a cooler for cooling of the exhaust gas compressed by the compressor to condense moisture in the exhaust gas to discharge drainage with the impurities dissolved, and at least a single rear impurity-removing device with a rear compressor for compression of the exhaust gas to a pressure higher than that of the compressor and a rear cooler to discharge drainage. A water sprayer for humidifying the exhaust gas from the oxyfuel combustion device and a front cooler are provided for producing and discharging drainage with impurities dissolved therein upstream of the compressor in the front impurity-removing device.

6 Claims, 2 Drawing Sheets

(51) Int. Cl.
  *B01D 53/26* (2006.01)
  *B01D 53/64* (2006.01)
  *F23J 15/06* (2006.01)
  *F23L 7/00* (2006.01)
  *F01N 3/04* (2006.01)
  *F01N 3/02* (2006.01)

(52) U.S. Cl.
  CPC ...... *B01D 2258/0283* (2013.01); *F01N 3/0205* (2013.01); *F01N 3/04* (2013.01); *F01N 2290/06* (2013.01); *F23J 2219/70* (2013.01); *Y02E 20/344* (2013.01); *Y02E 20/363* (2013.01)

(56) References Cited

U.S. PATENT DOCUMENTS 8,715,605 B2 * 5/2014 Court et al. ............... 423/437.1
2008/0226515 A1 9/2008 Allam et al.

OTHER PUBLICATIONS

U.S. Appl. No. 14/662,445, filed Mar. 19, 2015, Naito
U.S. Appl. No. 14/663,520, filed Mar. 20, 2015, Naito.

* cited by examiner

EXHAUST GAS TREATMENT SYSTEM FOR OXYFUEL COMBUSTION DEVICE

TECHNICAL FIELD

The present invention relates to an exhaust gas treatment system for an oxyfuel combustion device and specifically relates to an exhaust gas treatment system for an oxyfuel combustion device which can remove impurities in exhaust gas from the oxyfuel combustion device by simple appliances.

BACKGROUND ART

Recently, an oxyfuel combustion device has been studied as one of techniques for reducing emission of carbon dioxide ($CO_2$) which is the to be one of reasons for global warming; attention is attracted to, for example, a coal burning boiler for oxyfuel combustion of pulverized coal in which oxygen is used as an oxidizing agent in lieu of air to produce exhaust gas mainly comprising $CO_2$. It has been conceived that such exhaust gas with high $CO_2$ concentration is compressed, cooled and recovered as liquefied carbon dioxide for disposal; alternatively, the exhaust gas may be pressurized and stored in the ground. Such exhaust gas treatment system for a coal burning boiler for oxyfuel combustion is disclosed in Patent Literature 1.

As shown in Patent Literature 1, the exhaust gas from the coal burning boiler for oxyfuel combustion of coal contains not only $CO_2$ but also impurities derived from coal feedstock such as nitrogen oxides ($NO_x$), sulfur oxides ($SO_x$), hydrargyrum (Hg), hydrogen chloride (HCl) and dust. The $NO_x$ as impurities may include nitrogen dioxide ($NO_2$) which is contacted with and dissolved in water into nitric acid. However, in the exhaust gas from the coal burning boiler having less oxygen ($O_2$), $NO_x$ exists substantially in the form of nitrogen monoxide (NO) which is water-insoluble and unremovable, for example, by spraying; the $SO_x$ is contacted with and dissolved in water into sulfuric acid; and the HCl is dissolved in water into hydrochloric acid. Such impurities are to be preferably removed at an early stage especially because the sulfuric acid is known to have a problem of eroding appliances in an exhaust gas treatment system and the Hg is known to damage low-temperature aluminum members in a heat exchanger. There is also a problem that commingling of the impurities lowers a purity of $CO_2$ and makes it difficult to liquefy the same through compression and cooling. Thus, for example in a coal burning boiler for oxyfuel combustion, an exhaust gas treatment system is required for removal of impurities.

Thus, it may be conceived that an exhaust gas treatment system, for example, for a coal burning boiler for oxyfuel combustion is provided with a so-called wet desulfurization device for removal of $SO_x$ as shown in FIG. 2 of Patent Literature 1 which is of a spray- or a packed-column type and which has been used for a conventional air burning boiler or the like. $NO_x$ derived from coal feedstock is produced in the exhaust gas from, for example, the coal burning boiler for oxyfuel combustion so that a denitration device for removal of $NO_x$ is required, though it is not disclosed in Patent Literature 1.

It is known that provision of the wet desulfurization device as mentioned above brings about removal of not only $SO_x$ but also dust as well as a certain level of Hg and HCl. When the exhaust gas with the impurities being removed therefrom by the exhaust gas treatment has a high Hg concentration, a Hg-removing column is arranged for removal of Hg by adsorbent or the like.

CITATION LIST

Patent Literature

[Patent Literature 1] JP 2010-172878A

SUMMARY OF INVENTION

Technical Problems

However, the conventional exhaust gas treatment system as mentioned in the above has problems of largeness in size, complication in structure and increase in equipment cost since the system is provided with independent spray- or packed-column type desulfurization and denitration devices.

The invention was made in view of the above-mentioned conventional problems and has its object to provide an exhaust gas treatment system for an oxyfuel combustion device which can remove impurities in exhaust gas from an oxyfuel combustion device by simple appliances.

Solution to Problems

The invention is directed to an exhaust gas treatment system for an oxyfuel combustion device for removal of impurities in exhaust gas from the oxyfuel combustion device comprising a front impurity-removing device with a compressor for compressing the exhaust gas from the oxyfuel combustion device to make the impurities in the exhaust gas water-soluble and with a cooler for cooling the exhaust gas compressed by the compressor to condense moisture in the exhaust gas to thereby discharge drainage with the impurities dissolved therein, and at least a single rear impurity-removing device with a rear compressor for compressing the exhaust gas to a pressure higher than that of the first-mentioned compressor and a rear cooler to thereby discharge the drainage.

In the exhaust gas treatment system for the oxyfuel combustion device, the rear impurity-removing device may comprise the rear compressor and a desulfurization and denitration column for circularly making water cooled by the cooler contact with the exhaust gas pressurized by the rear compressor.

In the exhaust gas treatment system for the oxyfuel combustion device, a front cooler may be provided upstream of the compressor in the front impurity-removing device.

The exhaust gas treatment system for the oxyfuel combustion device may further comprise a liquefier into which the exhaust gas is introduced downstream of the rear impurity-removing device through driers for compression and cooling into liquefied carbon dioxide.

Advantageous Effects of Invention

In an exhaust gas treatment system for an oxyfuel combustion device according to the invention, simple appliances, i.e., compressors and coolers can bring about an excellent effect that impurities in exhaust gas can be effectively removed.

DESCRIPTION OF EMBODIMENTS

Embodiments of the invention will be described in conjunction with attached drawings.

Figure 1:
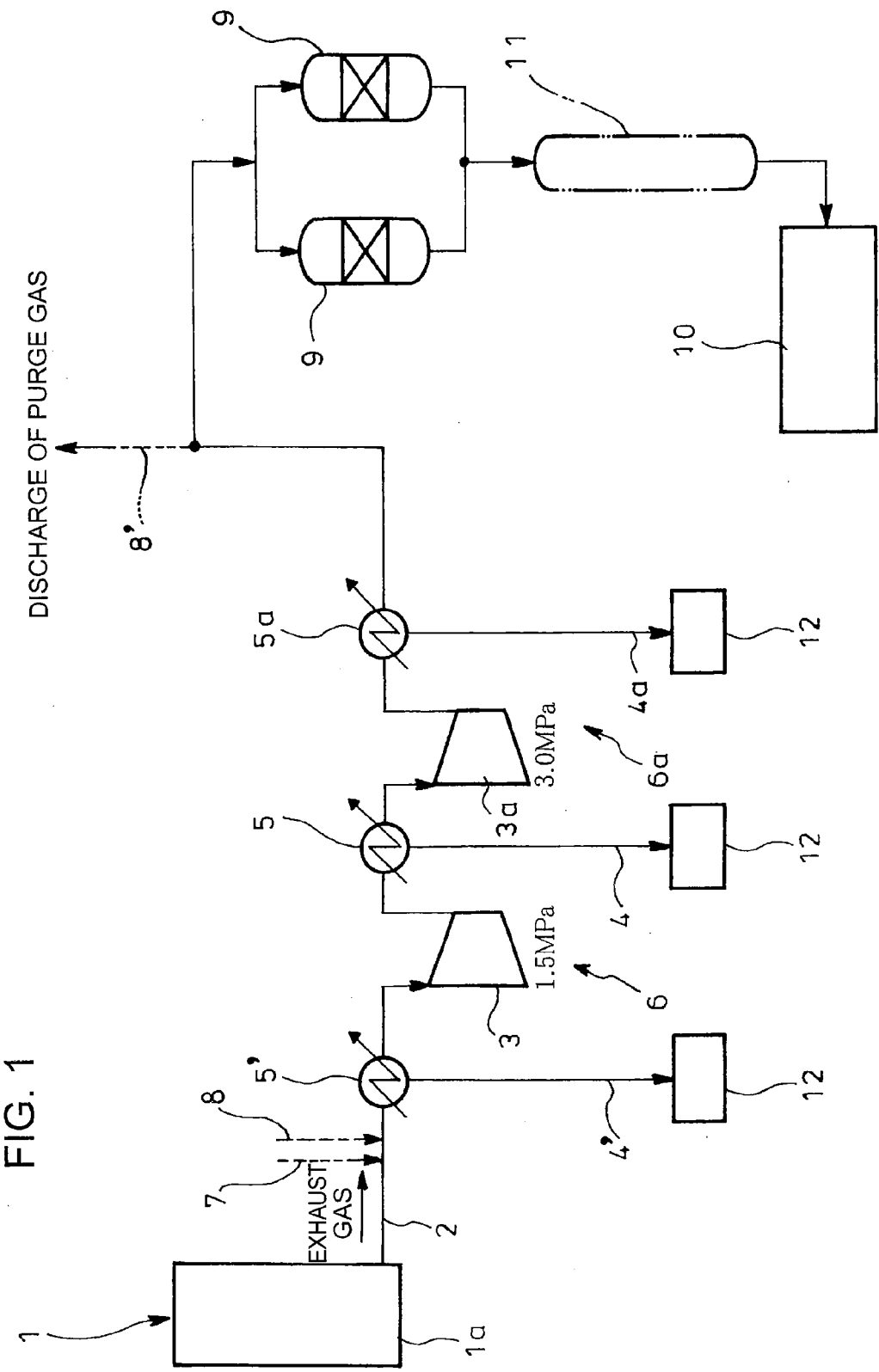
FIG. 1 is a schematic diagram showing an embodiment of an exhaust gas treatment system for an oxyfuel combustion device in the invention.

FIG. 1 is a systematic diagram showing an embodiment of an exhaust gas treatment system for an oxyfuel combustion device in the invention. In FIG. 1, reference numeral 1 denotes the oxyfuel combustion device comprising a coal burning boiler 1a for oxyfuel combustion of pulverized coal. In the oxyfuel combustion device 1, heat of exhaust gas resulting from oxyfuel combustion is recovered with heat exchange. Part of the exhaust gas heat-exchanged is recirculated as combustion gas, and remaining unrecirculated exhaust gas with a temperature of, for example, 100° C. is discharged outside through an exhaust gas passage 2. If no recirculation of the exhaust gas is conducted, the exhaust gas with a temperature over the above-mentioned 100° C. is discharged. The exhaust gas passage 2 shown in FIG. 1 is provided with a front impurity-removing device 6 comprising a compressor 3 which compresses the exhaust gas from the oxyfuel combustion device 1 to make impurities in the exhaust gas water-soluble and a cooler 5 which cools the exhaust gas compressed by the compressor 3 to condense moisture in the exhaust gas to thereby discharge drainage 4 with the impurities dissolved therein. Arranged upstream of the compressor 3 is a front cooler 5' which cools the exhaust gas from the oxyfuel combustion device 1 so as to enhance a compression efficiency of the compressor 3, drainage 4' with the moisture condensed by the cooling by the front cooler 5' and with the impurities dissolved therein being discharged.

Provided downstream of the front impurity-removing device 6 is a rear impurity-removing device 6a comprising a rear compressor 3a which compresses the exhaust gas to a pressure higher than that of the compressor 3 to make the impurities in the exhaust gas water-soluble, and a rear cooler 5a which cools the exhaust gas compressed by the rear compressor 3a to condense moisture and discharge drainage 4a with the impurities being dissolved therein. Illustrated in FIG. 1 is a case where the single rear impurity-removing device 6a is provided; an additional rear impurity-removing device may be provided which compresses with still higher pressure for removal of the impurities. Since the drainages 4', 4 and 4a have impurities such as dust, $CO_2$, $SO_x$, $NO_x$, Hg and HCl removed from the exhaust in admixed state, it is preferable that drainage treatment devices 12 are provided as shown in FIG. 1 for water detoxification.

When moisture is little in the exhaust gas from the oxyfuel combustion device 1 and there are few drainages 4', 4 and 4a, the exhaust gas may be humidified by spraying the water 7, thereby producing drainage.

The exhaust gas downstream of the rear impurity-removing device 6a is introduced through driers 9 to a liquefier 10 where the exhaust gas is compressed and cooled to obtain liquefied carbon dioxide. When Hg concentration in the exhaust gas made free from the impurities by the front and rear impurity-removing devices 6 and 6a is higher than a set target value, a Hg-removing column 11 may be arranged for removal of Hg through, for example, adsorbent.

Next, a mode of operation of the above embodiment will be described.

In the oxyfuel combustion device 1, the heat of the exhaust gas from the oxyfuel combustion is recovered through heat exchange. Part of the exhaust gas heat-exchanged is recirculated as combustion gas, and a remaining unrecirculated exhaust gas is discharged outside through an exhaust gas passage 2. The exhaust gas of, for example, of the order of 1 atm (0.1 Pa) and with a temperature of 100° C. discharged through the exhaust gas passage 2 is firstly guided to the front cooler 5' where it is cooled, for example, into 35° C. so as to enhance compression efficiency by the downstream compressor 3. The front cooler 5' cools the exhaust gas to condense the moisture, thereby discharging the drainage 4' with the impurities such as dust, $CO_2$, $SO_x$, $NO_x$, Hg and HCl dissolved therein. Among the $NO_x$, the nitrogen dioxide $NO_2$ is dissolved in the water and removed as nitric acid; however, in the exhaust gas from the coal burning boiler having little oxygen $O_2$, $NO_x$ exists mostly in the form of nitrogen monoxide (NO) which is insoluble in water and slightly existing $NO_2$ is only removed by the front cooler 5'.

The exhaust gas passing through the front cooler 5' is introduced into the compressor 3 in the front impurity-removing device 6 for pressurization to 1.5 MPa. A temperature of the exhaust gas in this state is, for example, 200° C. As mentioned in the above, the pressurization of the exhaust gas into the enhanced pressure makes the impurities in the exhaust gas water-soluble; that is, even in the state of little oxygen $O_2$, equilibrium situation varies for change of the water-insoluble NO and $SO_2$ become water-soluble $NO_2$ and $SO_3$, respectively. Then, the compressed exhaust gas is cooled by the cooler 5 into, for example, 30° C. so that the moisture in the exhaust gas is condensed. As a result, dust and water-soluble $CO_2$, $SO_x$, $NO_x$, Hg and HCl in the exhaust gas is caught by the condensed water and is discharged together with the drainage 4. Though the removal rate of $SO_x$ and $NO_x$ in the front impurity-removing device 6 also depends on concentrations of $SO_x$ and $NO_x$ in the exhaust gas, $SO_x$ and $NO_x$ in the exhaust gas are removed up to about 99% and about 90%, respectively.

The exhaust gas treated in the front impurity-removing device 6 is pressurized by the rear compressor 3a in the rear impurity-removing device 6a up to 3 MPa which is higher than that by the compressor 3. A temperature of the exhaust gas in this state is, for example, about 150° C. As mentioned in the above, the pressurization of the exhaust gas into enhanced pressure further enhances the water-solubility of the impurities in the exhaust gas. Then, the compressed exhaust gas is cooled by the rear cooler 5a into, for example, 30° C. and the moisture in the exhaust gas is condensed so that the dust and water-soluble $CO_2$, $SO_x$, $NO_x$, Hg and HCl in the exhaust gas are caught by the condensed water with further higher removal rate and are discharged together with the drainage 4a. In the rear impurity-removing device 6a, $SO_x$ and $NO_x$ in the exhaust gas are eventually removed up to about 100% and about 95-99%, respectively.

The exhaust gas downstream of the rear impurity-removing device 6a undergoes moisture removal (dryness) by driers 9 so as not to cause condensation in the liquefier 10, and then guided to the liquefier 10 where the exhaust gas is compressed and cooled to obtain liquefied carbon dioxide.

The above-mentioned compressor 3 and rear compressor 3a are in an acid corrosive environment, which is deemed harmless during the operation because of being high-temperature but may bring about a corrosion problem of the appliances on and after shutdown. Thus, it is preferable to take corrosion countermeasure such as feed of, for example, nitrogen gas through a purge conduit 8 to purge the exhaust gas passage 2. Reference numeral 8' denotes a purge gas discharge pipe.

Use of the two-staged front and rear impurity-removing devices 6 and 6a for removal of the impurities in the FIG. 1 embodiment is based on a problem that pressurization of voluminous exhaust gas up to 3 MPa is technically difficult to attain through a single compressor and may become extremely mechanically expensive. The two compressors 3 and 3a each for pressurization up to 1.5 MPa are provided to overcome the problem and to provide practically beneficial equipment for pressurization totally up to 3 MPa.

Figure 2:
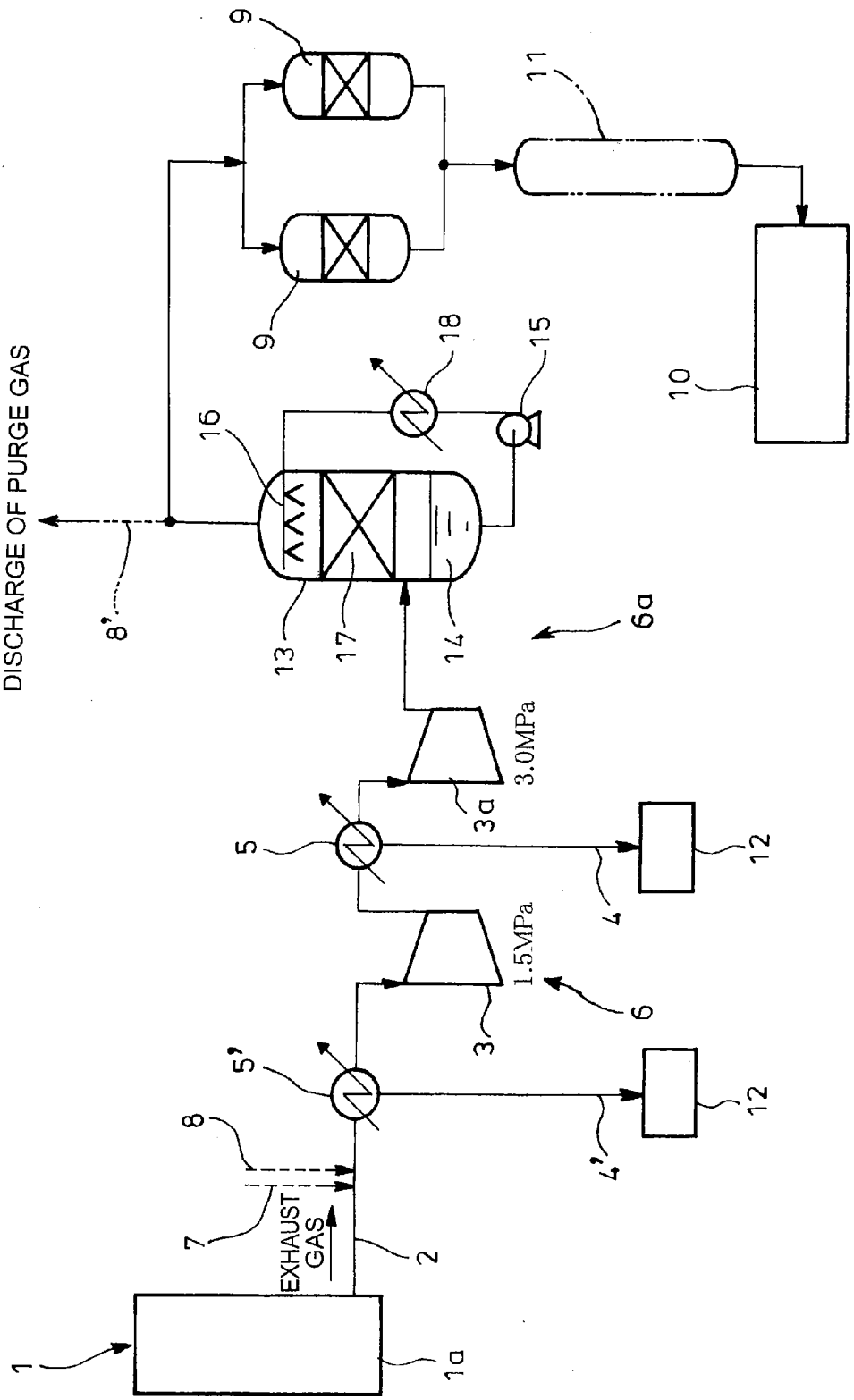
FIG. 2 is a systematic diagram showing a further embodiment of the exhaust gas treatment system for the oxyfuel combustion device in the invention.

FIG. 2 is a systematic diagram showing a further embodiment of the exhaust gas treatment system for the oxyfuel combustion device according to the invention, which is similar to the FIG. 1 structure except for a structure of the rear impurity-removing device 6a. The rear impurity-removing device 6a shown in FIG. 2 comprises the rear compressor 3a capable of pressurization with higher pressure than that of the compressor 3 in the front impurity-removing device 6 and a desulfurization and denitration column 13 into which the exhaust gas pressurized by the rear compressor 3a is introduced for exhaust gas treatment. In the desulfurization and denitration column 13, water 14 at an inner bottom of the column body is pumped and circularly fed by a pump 15 to an upper nozzle 16 and injected onto a filler 17; the exhaust gas introduced through a barrel side portion of the column body contacts with water 14 while flowing through the filler 17 and is discharged through an upper portion. The exhaust gas pressurized by the rear compressor 3a up to 3 MPa, which has a temperature of, for example, 150° C., is introduced into the desulfurization and denitration column 13. A cooler 18 is provided for cooling of the water 14 guided by the pump 15 to the nozzle 16 into a temperature of, for example, 7° C. Thus, the moisture in the exhaust gas is condensed so that the impurities in the exhaust gas are recovered in the water.

The system of FIG. 2 can exhibit effects and advantages equivalent to those in the FIG. 1 system. Further, the exhaust gas introduced into the desulfurization and denitration column 13 is pressurized by the rear compressor 3a to 3 MPa so that the exhaust gas of 0.1 MPa from the oxyfuel combustion device 1 is reduced in gas amount to ⅓₀, and thus the desulfurization and denitration column 13 can be made compact in size.

As mentioned in the above, according to the invention, the moisture-containing exhaust gas from the oxyfuel combustion device 1 is pressurized and cooled into condensation of the moisture so that the impurities in the exhaust gas are removed together with drainage, and thus the system can be remarkably made simple in structure or downsized while attaining a removal rate competing to the prior art.

It is to be understood that an exhaust gas treatment system for an oxyfuel combustion device according to the invention is not limited to the above embodiments and that various changes and modifications may be made without departing from the scope of the invention. For example, the invention may be applicable to oxyfuel combustion devices using various kinds of fuels.

INDUSTRIAL APPLICABILITY

An exhaust gas treatment system for an oxyfuel combustion device according to the invention may be applied for simplification in structure of an exhaust gas treatment system for an oxyfuel combustion device.

REFERENCE SIGNS LIST 1 oxyfuel combustion device
3 compressor
3a rear compressor
4,4a drainage
5 cooler
5' front cooler
5a rear cooler
6 front impurity-removing device
6a rear impurity-removing device
9 drier
10 liquefier
13 desulfurization and denitration column
18 cooler

The invention claimed is:

1. An exhaust gas treatment system for an oxyfuel combustion device for removal of impurities in exhaust gas from the oxyfuel combustion device comprising:
   a front impurity-removing device with a compressor for compressing the exhaust gas from the oxyfuel combustion device to make the impurities in the exhaust gas water-soluble and with a cooler for cooling the exhaust gas compressed by the compressor to condense moisture in the exhaust gas, thereby discharging drainage with the impurities dissolved therein;
   at least a single rear impurity-removing device with a rear compressor for compressing the exhaust gas to a pressure higher than that of the first-mentioned compressor and with a rear cooler for cooling the exhaust gas compressed by the rear compressor to condense moisture in the exhaust gas, thereby discharging the drainage with the impurities dissolved therein;
   a front cooler upstream of the compressor in the front impurity-removing device for cooling the exhaust gas from the oxyfuel combustion device, thereby discharging the drainage with the impurities dissolved therein; and
   a sprayer for spraying water upstream of the front cooler to humidify the exhaust gas from the oxyfuel combustion device to thereby produce the drainages in the front cooler.

2. The exhaust gas treatment system as claimed in claim 1, wherein the exhaust gas downstream of the rear impurity-removing device is guided through driers to a liquefier where the exhaust gas is compressed and cooled into liquefied carbon dioxide.

3. The exhaust gas treatment system as claimed in claim 2, wherein an Hg-removing column is arranged between the driers and the liquefier.

4. The exhaust gas treatment system as claimed in claim 1, wherein the rear impurity-removing device includes a desulfurization and denitration column for circularly making water cooled by the cooler contact with the exhaust gas pressurized by the rear compressor.

5. The exhaust gas treatment system as claimed in claim 4, wherein the exhaust gas downstream of the rear impurity-removing device is guided through driers to a liquefier where the exhaust gas is compressed and cooled into liquefied carbon dioxide.

6. The exhaust gas treatment system as claimed in claim 5, wherein an Hg-removing column is arranged between the driers and the liquefier.

* * * * *